B. H. & F. L. CALKIN.
PERCOLATOR.
APPLICATION FILED AUG. 6, 1915.
1,242,651.
Patented Oct. 9, 1917.
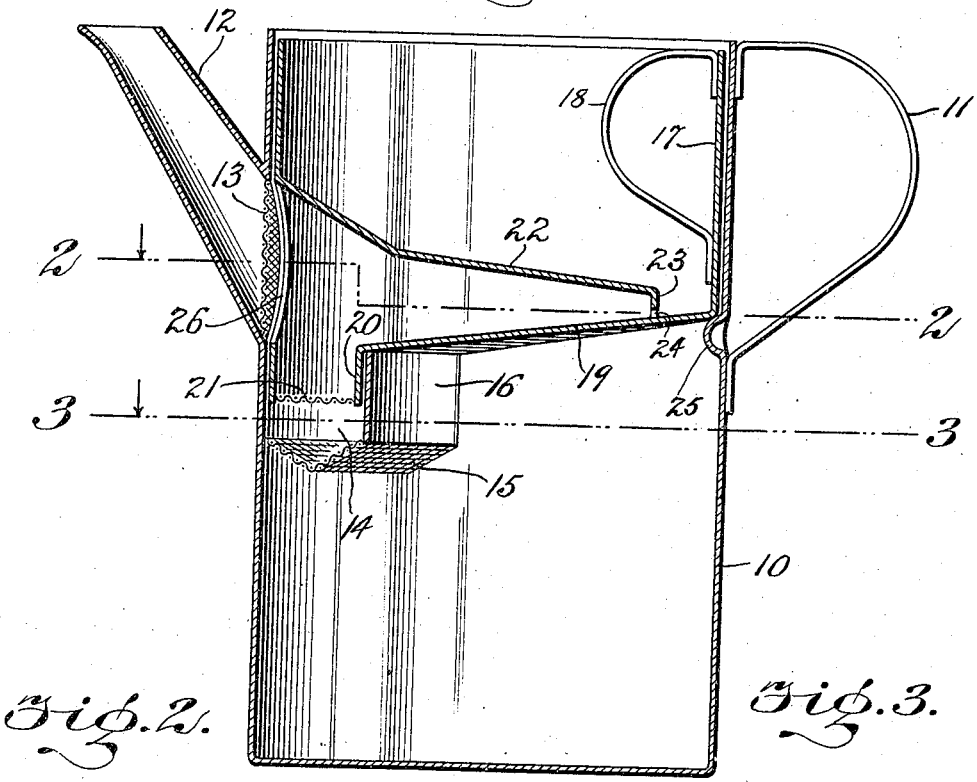
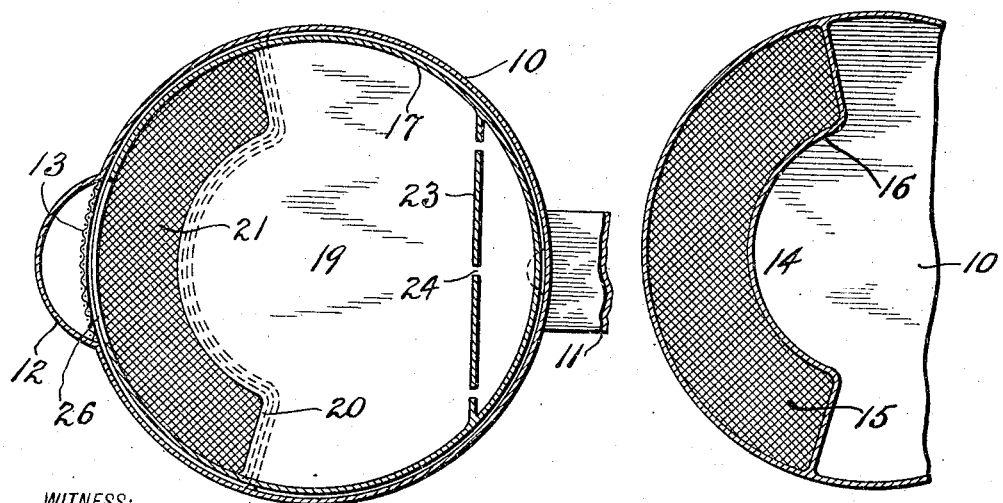
WITNESS:
A. C. Abbott
INVENTORS
Benjamin H. Calkin and
Frances L. Calkin
BY
Edson Bernhard
ATTORNEYS

UNITED STATES PATENT OFFICE.

BENJAMIN H. CALKIN AND FRANCES L. CALKIN, OF DETROIT, MICHIGAN; SAID BENJAMIN H. CALKIN ASSIGNOR TO SAID FRANCES L. CALKIN.

PERCOLATOR.

1,242,651.

Specification of Letters Patent.

Patented Oct. 9, 1917.

Application filed August 6, 1915. Serial No. 43,918.

*To all whom it may concern:*

Be it known that we, BENJAMIN H. CALKIN and FRANCES L. CALKIN, subjects of the King of Great Britain, residing at Detroit, county of Wayne, and State of Michigan, have invented a certain new and useful Percolator, of which the following is a specification.

This invention pertains to a percolator for expeditiously preparing a small quantity of beverage, such as coffee, whereby a freshly prepared cup or two of the beverage may be served by a restaurateur upon order of a guest.

According to this invention, a small quantity of ground coffee is deposited within a perforated container which is positioned within the percolator, the latter having a pouring tube the inlet to which is adjacent to the container, whereby water may flow through the coffee for extracting the essential oils therefrom and the resulting beverage is caused to again flow, in a reverse direction, through the ground coffee and thence to flow directly into the pouring spout, the liquid thus flowing and reflowing through the ground coffee for effecting a thorough extraction.

A salient feature of the invention consists of means for effecting a slow retarded flow of the liquid through the ground coffee, whereby the liquid remains in contact with the coffee for an appreciable length of time and the retarded flow of the liquid prevents the finely ground coffee from being washed off the perforated metal so as to result in exposure of the bare mesh of said metal. To this end, a water receptacle is employed, the same having a depending nipple provided with a perforated bottom adapted to extend into the coffee container, said water receptacle extending over the nipple and being provided with apertures positioned out of line with the coffee receptacle, whereby the water is regulated to flow in a slow stream or streams to the coffee receptacle.

Other features and advantages of the invention will be pointed out in the following detailed description taken in connection with the drawings.

In said drawings,

Figure 1 is a vertical section through a percolator embodying the invention.

Figs. 2 and 3 are horizontal sections taken on the lines 2—2 and 3—3 respectively of Fig. 1.

The percolator embodies a vessel 10, composed of metal or other material and constructed of a desired shape and size. As shown, the vessel is open at the top, and is provided with a suitable handle 11. Said vessel is provided, also, with a pouring tube 12, the inlet to which is at a point intermediate the height of said vessel, said inlet to the tube being covered by a perforated partition or screen 13.

Interiorly of the vessel, below the inlet to the pouring spout, is a coffee container 14, the same comprising a perforated bottom 15 attached to a wall 16 and to the vessel 10. The coffee container is shown in Figs. 1 and 3 as extending horizontally within the vessel 10, part way around the same, the wall 16 and the perforated bottom 15 being attached in a suitable way to the vessel, whereby the container occupies a fixed relation to said vessel. As shown, the perforated bottom 15 is approximately V-shaped in cross section in order that the ground coffee may be retained at the lowest point within the receptacle; but it is apparent that the particular shape of the receptacle or of its bottom may be modified as desired.

Removably fitted within the vessel 10 is a water receptacle 17, the same being provided with a handle 18 for inserting or removing said receptacle. The bottom 19 of said receptacle is inclined, and at the lowest part of the bottom is a depending nipple 20, the latter being adapted to extend into the coffee container 14. The nipple 20 is provided with a perforated bottom 21, composed of wire gauze or perforated metal, and upon the assemblage of the water receptacle with respect to vessel 10 and container 14 the perforated bottom 21 is positioned with the nipple 20 within the container 14, see Fig. 1, whereby the perforated bottoms 15, 21, coöperate in confining the ground coffee within the container.

The water receptacle is provided, also, with a partition 22, the same being in the nature of a false bottom positioned for controlling the flow of water so that it will not pass too rapidly to and through coffee, but on the contrary will flow slowly to the coffee and remain in contact therewith for an appreciable length of time. As shown the partition is inclined oppositely to the bottom 19 of the receptacle, said partition being inclined at a sharp angle next to one wall of the receptacle and at a less angle rearwardly toward the opposite wall. The partition extends across the nipple 20 so that water cannot flow thereto directly from the chamber of the receptacle, but as shown the rear part of the partition joins with a vertically positioned wall 23, the latter connecting the rear end of said inclined partition 22 with the inclined bottom 19. In said wall 23 are provided apertures 24 through which the water is adapted to flow in streams whereby the wall 23 and inclined members 19, 22 coöperate in retarding the flow of water to the coffee container.

The receptacle 17 rests at one edge upon a ledge 25 provided within the vessel 10, and at its forward edge said receptacle is supported by the container 14.

In operation, the receptacle 17 is removed from the vessel, a charge of ground coffee is deposited within container 14, and receptacle 17 is replaced for the nipple 20 to enter the container, in which position the bottom 19 is inclined toward the container and an opening 26 in the front wall of the receptacle 17 is in register with the inlet to the pouring tube. Water is now poured into the receptacle, the flow of water being directed rearwardly by the partition 22 and being retarded by the wall 23 so that the water flows in small streams through openings 24 and over the inclined bottom 19 to and through the nipple 20, its perforated bottom 21 and the perforated bottom 15 of the container 14. The water thus percolates slowly through the coffee confined within the container and between the perforated members 15, 21, as a result of which the water is in contact with the coffee for an appreciable length of time and the essential oils are thus extracted from the ground coffee. The extract is stored within the chamber at the bottom of the vessel 10, but to pour off the coffee the percolator is decanted, with the result that the extract flows through the ground coffee, again taking up essential oils and flavors therefrom, the liquid extract flowing out through the container 14, nipple 20, opening 26, and spout 12, and said liquid extract being thoroughly filtered by the action thereon of the ground coffee and the strainers 15, 21, 13.

It is apparent that the percolator is simple in construction and economical of manufacture. The parts can be readily assembled for use, and as readily separated to permit the interior surfaces of the various parts to be readily and thoroughly cleansed. Practical experience with the device has demonstrated its efficiency in the rapid and thorough extraction of essential oils from the ground coffee.

It is apparent that the device may be used, also, for the preparation of beverages other than coffee.

Having thus fully described the invention, what we claim as new and desire to secure by Letters Patent is:

1. A percolator embodying a vessel provided with a pouring spout, a container positioned within the vessel below said spout, a liquid receptacle fitted removably within said vessel for feeding liquid to said container, and means for retarding the flow of liquid from said receptacle to said container, said container being positioned intermediate the pouring spout and the chamber of said vessel and operating to secure, during the decanting operation, a reflow of the beverage into contact with the material within said container prior to the outflow of said beverage through said pouring spout.

2. A percolator embodying a vessel provided with a pouring spout, a container attached to said vessel and positioned below said pouring spout, and a removable liquid receptacle, said receptacle being provided with means operating to direct the flow of liquid in an irregular path to the container and to retard the flow of said liquid to the end that the liquid will flow slowly to the container and will remain in contact for an appreciable length of time with a charge of material adapted to be placed within the container, said container being positioned intermediate the pouring spout and the chamber of said vessel and operating to secure, during the decanting operation, a reflow of the beverage into contact with the material within said container prior to the outflow of said beverage through said pouring spout.

3. A percolator embodying a vessel provided with a pouring spout, a container attached to said vessel and positioned below said pouring spout, a liquid receptacle positioned removably within the vessel, said receptacle being provided with a nipple adapted to enter the container, and means carried by said receptacle for retarding the flow of liquid from said receptacle to the container, said container being positioned intermediate the pouring spout and the chamber of said vessel and operating to secure, during the decanting operation, a reflow of the beverage into contact with the material within said container prior to the outflow of said beverage through said pouring spout.

4. A percolator embodying a vessel provided with a pouring spout, a container attached to said vessel and positioned below said pouring spout, said container being provided with a foraminous bottom, a liquid receptacle the bottom of which is provided with a depending nipple adapted to enter the container, said nipple having a foraminous bottom positioned in coöperative relation to the similar bottom of the container, and means for directing the flow of liquid in an irregular path from the receptacle to the container, said container being positioned intermediate the pouring spout and the chamber of said vessel and operating to secure, during the decanting operation, a reflow of the beverage into contact with the material within said container prior to the outflow of said beverage through said pouring spout.

5. A percolator embodying a vessel provided with a pouring spout, a container attached to the receptacle and positioned below said spout, and a receptacle the bottom of which is inclined toward the container, said receptacle having an interior partition inclined oppositely to the bottom and provided with flow openings through which liquid is free to flow in streams slowly to the container, said container being positioned intermediate the pouring spout and the chamber of said vessel and operating to secure, during the decanting operation, a reflow of the beverage into contact with the material within said container prior to the outflow of said beverage through said pouring spout.

6. A percolator embodying a vessel provided with a pouring spout, the inlet to which is covered by a screen, a container provided with a screen bottom, a liquid receptacle the bottom of which is provided with a screen adapted to coöperate with the screen of the container in confining a charge of material, and means coöperating with the receptacle in retarding the flow of liquid to said container, said container being positioned intermediate the pouring spout and the chamber of said vessel and operating to secure, during the decanting operation, a reflow of the beverage into contact with the material within said container prior to the outflow of said beverage through said pouring spout.

In testimony whereof we have signed our names to this specification.

BENJAMIN H. CALKIN.
FRANCES L. CALKIN.

Copies of this patent may be obtained for five cents each, by addressing the "Commissioner of Patents, Washington, D. C."